(12) United States Patent
Harrington (10) Patent No.: US 8,096,708 B2
(45) Date of Patent: Jan. 17, 2012

(54) DIGITAL LINEAR HEAT DETECTOR WITH THERMOCOUPLE HEAT CONFIRMATION

(75) Inventor: Brian P. Harrington, Plymouth, MA (US)

(73) Assignee: The Protectowire Company, Inc., Plymouth, MA (US)

(*) Notice: Subject to any disclaimer, the term of this patent is extended or adjusted under 35 U.S.C. 154(b) by 355 days.

(21) Appl. No.: 12/370,093

(22) Filed: Feb. 12, 2009

(65) Prior Publication Data
US 2010/0202491 A1 Aug. 12, 2010

(51) Int. Cl.
*G08B 17/06* (2006.01)
*G08B 25/04* (2006.01)
*G01K 7/00* (2006.01)

(52) U.S. Cl. .......... 374/179; 374/163; 374/E7.001
(58) Field of Classification Search ........... 374/179, 374/163, 170, 183, 185, E7.001; 340/577, 340/584, 590
See application file for complete search history.

(56) References Cited

U.S. PATENT DOCUMENTS

| | | | |
|---|---|---|---|
| 2,185,944 A | 1/1940 | Holmes | |
| 4,453,159 A * | 6/1984 | Huff et al. | 340/590 |
| 4,491,822 A | 1/1985 | Davis | |
| 4,540,972 A | 9/1985 | Davis | |
| 4,625,200 A | 11/1986 | Hilborn et al. | |
| 4,638,107 A | 1/1987 | Davis | |
| 4,647,710 A | 3/1987 | Davis | |
| 2008/0013598 A1 * | 1/2008 | Perotti et al. | 374/179 |
| 2008/0084268 A1 | 4/2008 | Zhang | |
| 2010/0142584 A1 | 6/2010 | Harrington et al. | |
| 2011/0102183 A1 * | 5/2011 | Tenchio | 340/577 |

FOREIGN PATENT DOCUMENTS

| | | |
|---|---|---|
| EP | 1 914 696 | 4/2007 |
| EP | 2226775 A3 * | 10/2010 |
| WO | WO 2008/031627 | 3/2008 |

* cited by examiner

*Primary Examiner* — R. A. Smith
(74) *Attorney, Agent, or Firm* — Cesari and McKenna, LLP; Duane H. Dreger (57) ABSTRACT

The present invention provides a digital linear heat detector with thermocouple heat confirmation. A digital linear heat detector with thermocouple heat confirmation comprises a first conductor and a second conductor, the first conductor composed of a different conductive material than the second conductor. The first and second conductors are then are twisted together to form substantially continuous spring pressure between the first conductor and the second conductor, thereby causing the layers of the non-conductive heat sensitive thermoplastic material to be in contact. The present invention also includes a monitoring circuit that is configured to monitor resistance along the first and second conductors. When the resistance changes along the first and second conductors, the monitor is configured to detect a short and enter a thermocouple mode. By entering the thermocouple mode, the monitoring circuit is able to identify the temperature at the short and determine the type of alarm condition being created by the short based on a predetermined temperature threshold.

20 Claims, 9 Drawing Sheets

DIGITAL LINEAR HEAT DETECTOR WITH THERMOCOUPLE HEAT CONFIRMATION

FIELD OF THE INVENTION

The present invention relates to linear heat detectors and, more particularly to a digital linear heat detector with thermocouple heat confirmation.

BACKGROUND OF THE INVENTION

Remote temperature sensing systems are known in the art for the remote detection of overheated regions that may be utilized in, for example, fire detection and suppression systems, etc. One common type of remote temperature sensing system is a linear heat detector. There are a number of different types of linear heat detectors currently available including, for example, digital linear heat detectors and analog linear heat detectors.

Digital linear heat detectors are well-known in the art including, for example, U.S. Pat. No. 2,185,944 entitled FIRE-DETECTING CABLE by Willis Holmes, issued Jan. 2, 1940, the contents of which are hereby incorporated by reference. Generally, a digital linear heat detector comprises a pair of spring conductors made of similar metals. The spring conductors are coated with a special heat sensitive thermoplastic material that melts at a specific temperature. The two conductors are twisted together to maintain a substantially continuous spring pressure between the conductors. Typically, the twisted pair of conductors are wrapped in a protective Mylar® tape, before an outer jacket is extruded over the taped pair.

Figure 1A:
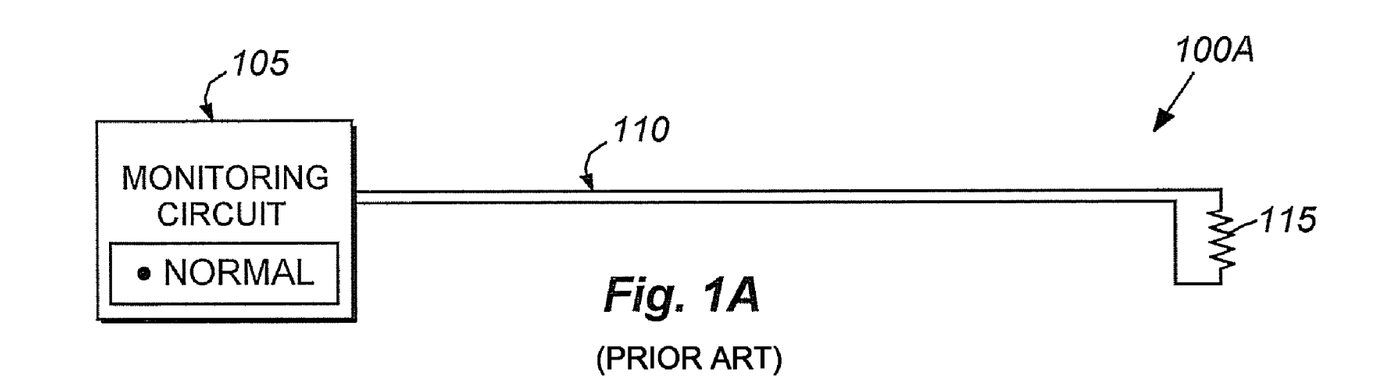
FIG. 1A, previously described, is a schematic block diagram of an exemplary digital linear heat detector environment.

FIG. 1A is a block diagram of an exemplary digital linear heat detector environment 100A illustrating a typical digital linear heat detector installation. A monitoring circuit 105 is operatively interconnected with a run of a digital linear heat detector 110, which is terminated by a resistor 115. The monitoring circuit 105 maintains a current flow through the digital linear heat detector 110 through the terminating resistor 115, which regulates the current flow through the digital linear heat detector. When current is flowing through the digital linear heat detector at a known level, the monitoring circuit 105 indicates that the system is in a NORMAL state.

Figure 1B:
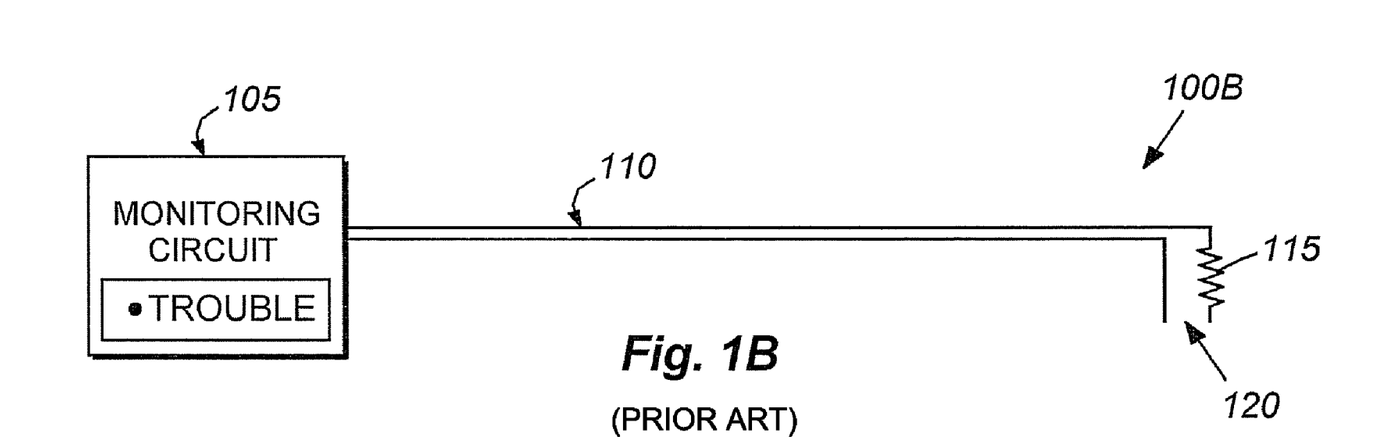
FIG. 1B, previously described, is a schematic block diagram of an exemplary digital linear heat detector environment illustrating an open circuit.

FIG. 1B is a block diagram of an exemplary digital linear heat detector environment 100B showing an open circuit 120 caused by a break in the digital linear heat detector. Such a break may be caused by, e.g., physical damage to the linear heat detector. In a situation as shown in environment 100B, the monitoring circuit 105 detects that the current flow has stopped, which causes the monitoring circuit 105 to indicate a TROUBLE state. Typically, the monitoring circuit 105 may sound an alarm or otherwise alert an administrator that the detection capabilities of the system are compromised and that corrective action needs to be taken to restore overheat detection functionality.

Figure 1C:
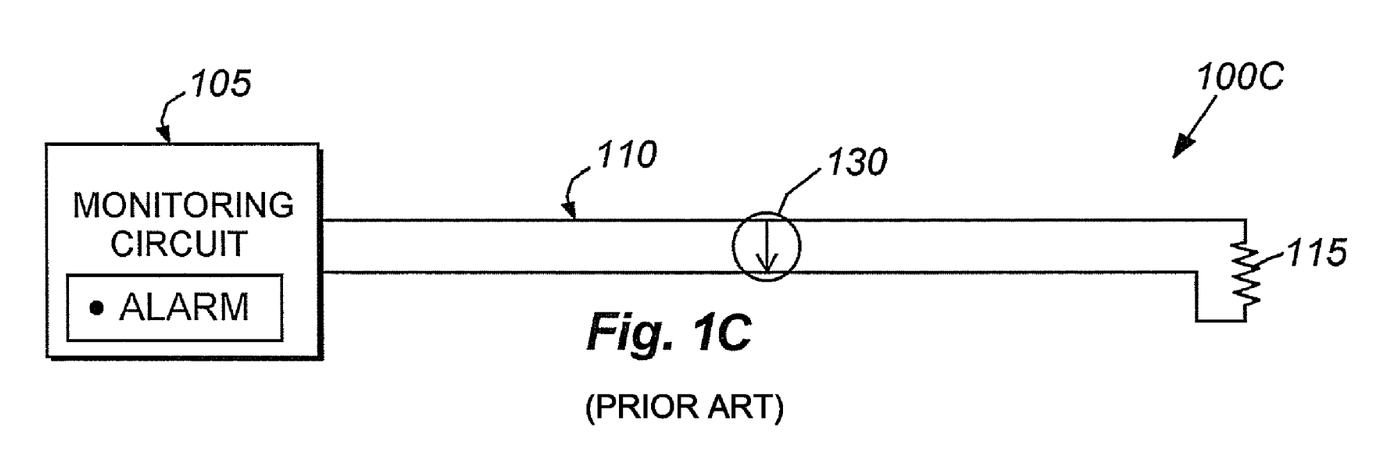
FIG. 1C, previously described, is a schematic block diagram of an exemplary digital linear heat detector illustrating detection of a short.

FIG. 1C is an exemplary digital linear heat detector environment 100C illustrating operation in the presence of a short 130 that may be caused by a fire or other overheat condition. Illustratively, a fire would raise the temperature higher than the melting point of the special heat sensitive thermoplastic material, thereby causing a short circuit enabling the two conductors to come into contact with each other, which results in an increase in the current through the digital linear heat detector due to the terminating resistor 115 being bypassed. In response, the monitoring circuit 105 will indicate this as an ALARM condition and take appropriate action, e.g., activation of fire suppression systems, etc. However, this leads to a noted disadvantage of digital linear heat detectors, namely, should the digital linear heat detector be physically damaged, thereby causing a short condition, the monitoring circuit 105 will move to an ALARM state with concomitant activation of fire suppression systems. As will be appreciated by one skilled in the art, activation of fire suppression systems in the absence of a fire may result in water damage to a building, goods being stored therein, potential injury to occupants, etc.

Typical digital linear heat detectors 110 have a known resistance, e.g., 0.2 Ohms per foot. Thus, during an ALARM state, the resistance along the digital linear heat detector may be measured to determine the location of the fire.

Figure 2:
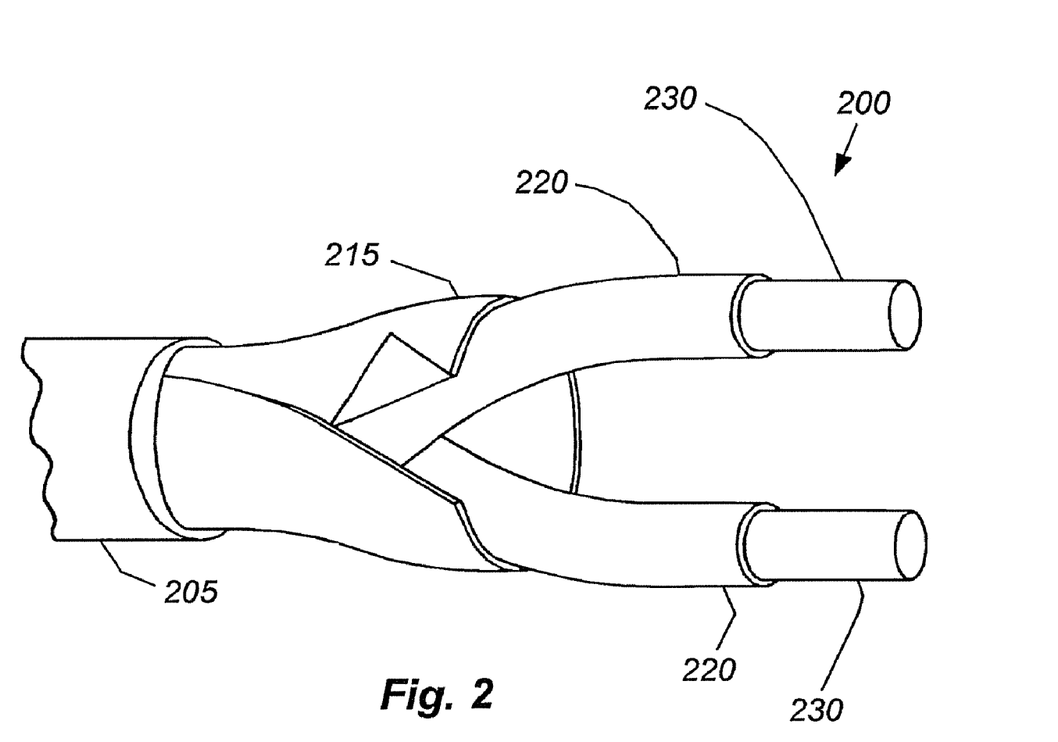
FIG. 2, previously described, is a schematic diagram of an exemplary cross section of a conventional digital linear heat detector.

FIG. 2 is a schematic diagram of a typical cross-section of a digital linear heat detector like that described in United States Publication No. 2010/0142584, published Jun. 10, 2010, by Brian P. Harrington et al., the contents of which are hereby incorporated by reference. The digital linear heat detector 200 comprises an outer jacket 205. The outer jacket 205 is typically an extruded covering that is comprised of some form of polyvinyl. This outer jacket houses two identical inner spring conductors 230 which are coated with a non-conductive heat sensitive material 220, respectively. The coated inner spring conductors are wrapped in a protective tape and/or shield 215, e.g., a Mylar® tape.

Certain recent improvements to linear heat detectors, such as that described in U.S. Pat. No. 7,671,717, issued on Mar. 2, 2010, by Weishe Zhang, et al., the contents of which are hereby incorporated by reference, improve on some of the noted disadvantages of digital linear heat detectors. The Zhang published application details a digital linear heat detector that works to prevent short circuits from causing an ALARM condition. However, a noted disadvantage exists, the Zhang linear heat detector cannot provide positive determination that a thermal event, i.e., an overheat condition, caused the ALARM condition. Furthermore, current systems do not allow for identification of the temperature at the short location.

Currently, the monitoring circuit 105 interprets all forms of short circuits in the same manner, i.e., as an ALARM. This occurs because conventional linear heat detectors cannot distinguish between a short circuit caused by the presence of an overheat condition and a short circuit caused from physical damage to the line (e.g., kinks in the line, animal damage, etc.). Without some form of temperature identification process, mechanical shorts/physical damage may result in spurious activation of fire suppression systems.

SUMMARY OF THE INVENTION

The present invention overcomes the disadvantages of the prior art by providing a digital linear heat detector with thermocouple heat confirmation that includes the advantages of digital linear heat detectors while eliminating disadvantages of conventional digital linear heat detectors. In operation, a length of the detector may be made throughout a building and operatively interconnected with a monitoring circuit. In an illustrative embodiment, the detector loops back to the monitoring circuit such as in a Class A fire detection circuit. In an alternative embodiment, the end of detector may be terminated by an end of the line resistor (e.g., a Class B circuit).

Illustratively, the novel linear heat detector of the present invention comprises a pair of spring conductors made of dissimilar metals/materials. These dissimilar metals may be any conductive alloy or metal (e.g., galvanized steel, nickel alloys, copper, etc.) provided that each conductor is made of a different conductive material. Both spring conductors are then coated with a non-conductive heat sensitive thermoplastic material. The coated conductors are twisted together to form a substantially continuous spring pressure between the two conductors. A protective tape and/or shield may be applied to the twisted conductors and covered with a non-conductive outer jacket.

Notably, the novel linear heat detector of the present invention provides several advantages over prior art digital and/or analog linear heat detectors. The novel linear heat detector does not generate ALARM states when a short is detected in the system. Rather, when a short occurs, the novel digital linear heat detector initiates a POTENTIAL ALARM state at the monitor. This signifies to the monitoring circuit to switch to a thermocouple heat identification mode (thermocouple mode). While in thermocouple mode, the monitor is able to measure the temperature at the location of the short because two dissimilar metals have joined, thereby creating a thermocouple. That is, the temperature can be calculated implementing the Seebeck effect (i.e., when two dissimilar metals come in contact with each other in a circuit, each metal creates an opposing voltage). Although the illustrative embodiment of the present invention discloses calculating the temperature using the Seebeck effect, it is well known in the art that other methods can be used to obtain the temperature at junction, (i.e., temperature as a function of the electromagnetic force (emf) in the system) and the foregoing is merely an exemplary illustrative embodiment of the present invention.

If the monitor determines that the temperature at the short is above a predetermined threshold temperature, the monitor initiates an ALARM condition and determines the location of the short. If, however, the monitor determines that the temperature at the short is below the predetermined threshold, then the monitor initiates a SHORT FAULT ALARM and determines the location of the short so that the short can be fixed. Another noted advantage of the present invention is that when a short occurs at some location along the linear heat detector, the monitor may detect additional shorts anywhere between the location of the short and the monitor, by performing the same process hereon.

Thus, the addition of thermocouple heat identification offers an improvement over conventional digital linear heat detectors by allowing the temperature at the short to be ascertained by the monitor. As such, the digital linear heat detector with the thermocouple heat identification of the present invention provides a fixed temperature threshold that is able to distinguish the difference between a short caused by physical damage and one caused by a heat source (e.g., a fire).

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention overcomes the disadvantages of the prior art by providing a digital linear heat detector with thermocouple heat confirmation that includes the advantages of digital linear heat detectors while eliminating disadvantages of conventional digital linear heat detectors. In operation, a length of the detector may be installed throughout a building and operatively interconnected with a monitoring circuit. In an illustrative embodiment, the detector loops back to the monitoring circuit such as in a Class A fire detection circuit. In an alternative embodiment, the end of detector may be terminated by an end of the line resistor (e.g., a Class B circuit).

Illustratively, the novel linear heat detector of the present invention comprises a pair of spring conductors made of dissimilar metals/materials. These dissimilar metals may be any conductive alloy or metal (e.g., galvanized steel, nickel alloys, copper, etc.) provided that each conductor is made of a different conductive material. Both spring conductors are then coated with a non-conductive heat sensitive thermoplastic material. The coated conductors are twisted together to form a substantially continuous spring pressure between the two conductors. A protective tape and/or shield may be applied to the twisted conductors and covered with a non-conductive outer jacket.

Notably, the novel linear heat detector of the present invention provides several advantages over prior art digital linear heat detectors. The novel linear heat detector can identify the current temperature at a short, thereby eliminating false alarms caused by physical damage or other non-heat induced sources. Furthermore, a secondary alarm state can be defined by a thermocouple created by the two dissimilar metals coming into contact with one another. Thus, they offer an improvement over conventional digital linear heat detectors. As such, the digital linear heat detector with thermocouple heat confirmation of the present invention provides a fixed/predetermined temperature activation that is unaffected by a detection of a short by the monitoring circuit.

A. Digital Linear Heat Detector Environment

Figure 3A:
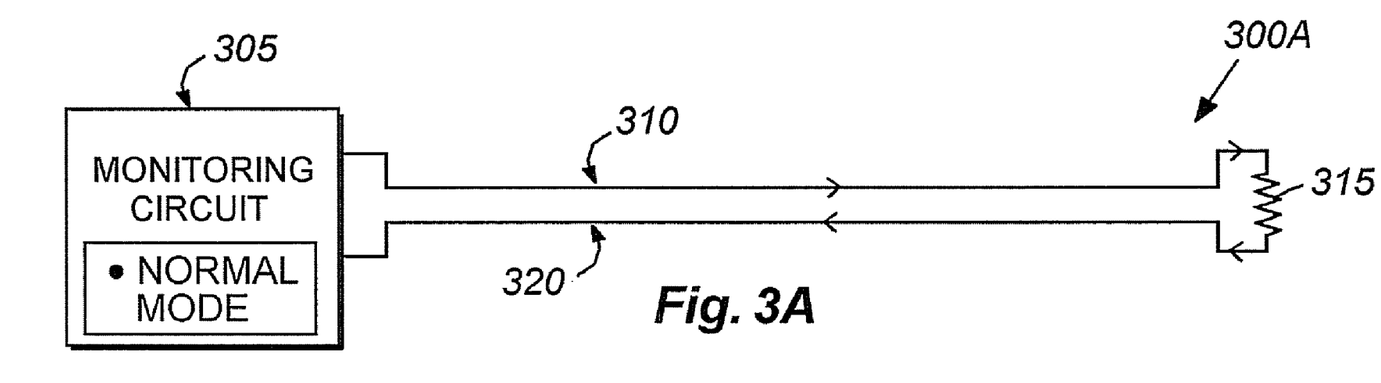
FIG. 3A is a schematic block diagram of an exemplary digital linear heat detector with thermocouple heat confirmation environment in accordance with an illustrative embodiment of the present invention.

FIG. 3A is a schematic diagram of an exemplary digital linear heat detector with thermocouple heat confirmation environment 300A in accordance with an illustrative embodiment of the present invention. A monitoring circuit 305 is operatively interconnected to a length of the digital linear heat detector with thermocouple heat confirmation 310 and 320. An end of the line resistor 315 terminates the digital linear heat detector with thermocouple heat confirmation. Digital linear heat detector with thermocouple heat confirmation installations thus typically resemble digital linear heat detector installations; however, due to the construction of the digital linear heat detector with thermocouple heat confirmation, described below, mechanical shorts will not cause false ALARM conditions, thereby preventing spurious activation of fire suppression systems, etc.

In operation, the monitoring circuit 305 monitors the loop resistance along the digital linear heat detector with thermocouple heat confirmation 310 and 320, which is fixed by the terminating resistor 315. The monitoring circuit 305 is configured so that the fixed steady state resistance along the digital linear heat detector with thermocouple heat confirmation 310 and 320 results in a NORMAL state.

Figure 3B:
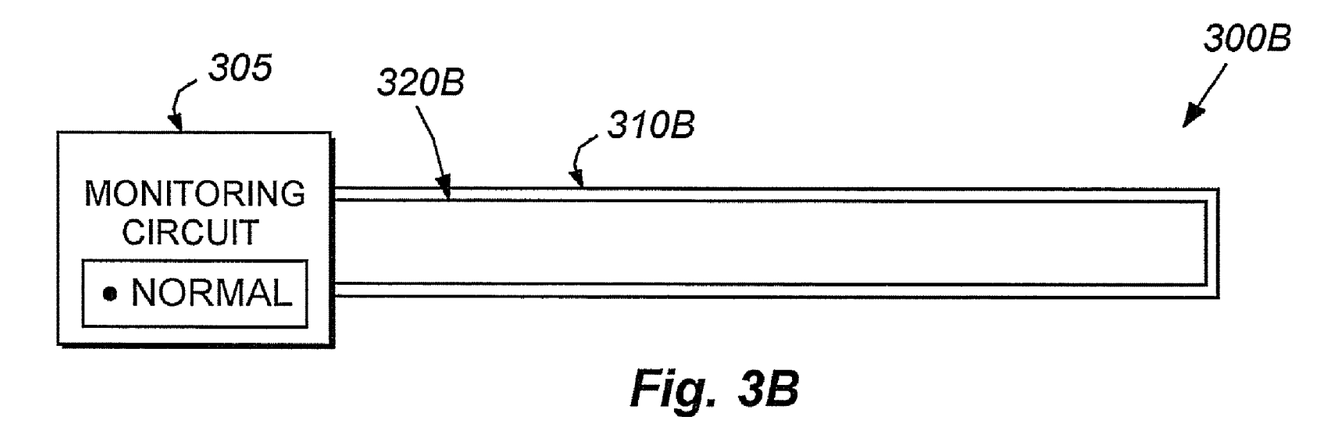
FIG. 3B is a schematic block diagram of an exemplary digital linear heat detector with thermocouple heat confirmation environment without a terminating resistor in accordance with an illustrative embodiment of the present invention.

FIG. 3B is a schematic block diagram of an exemplary digital linear heat detector with thermocouple heat confirmation environment of the present invention. A monitoring circuit 305 is operatively interconnected to a length of the digital linear heat detector with thermocouple heat confirmation 310A, B, and 320A, B. In exemplary environment 300B, at least a pair of dissimilar linear heat detector conductors 310A, B and 320A, B, loops back to the monitoring circuit 305 with no terminating resistor. Thus, in accordance with alternative embodiments of the present invention, the novel digital linear heat detector of the present invention may be resistor terminated (300A) or may form a complete loop back to the monitoring circuit (300B).

Figure 3C:
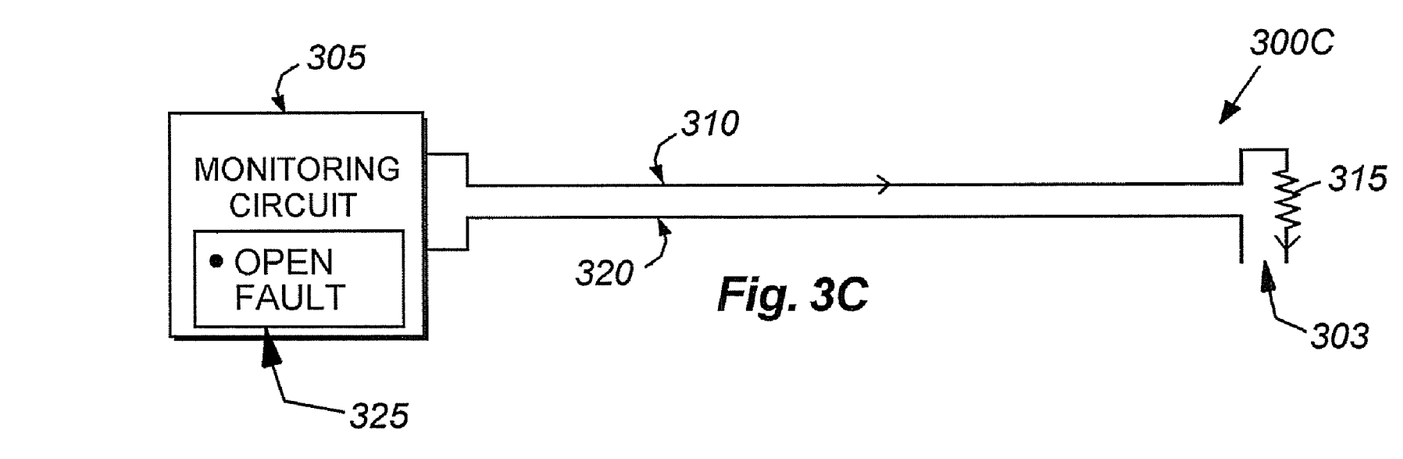
FIG. 3C is a schematic block diagram of an exemplary digital linear heat detector thermocouple heat identification environment illustrating an open circuit in accordance with an illustrative embodiment of the present invention.

FIG. 3C is a schematic diagram of an exemplary digital linear heat detector with thermocouple heat confirmation environment 300C similar to that shown in environment 300A. However, in environment 300C, an open circuit in the linear heat detector has occurred at location 303. The open circuit may be caused by a severed line or any other event which causes the current flow to equal zero. If an open circuit occurs, the loop resistance becomes infinite. The monitoring circuit 305 is illustratively configured to report an infinite resistance as an OPEN FAULT condition. This may cause the monitoring circuit 305 to, e.g., sound an alert or otherwise inform an administrator that there is an open circuit and that the overheat (e.g., fire) detection functionality has been compromised.

Figure 3D:
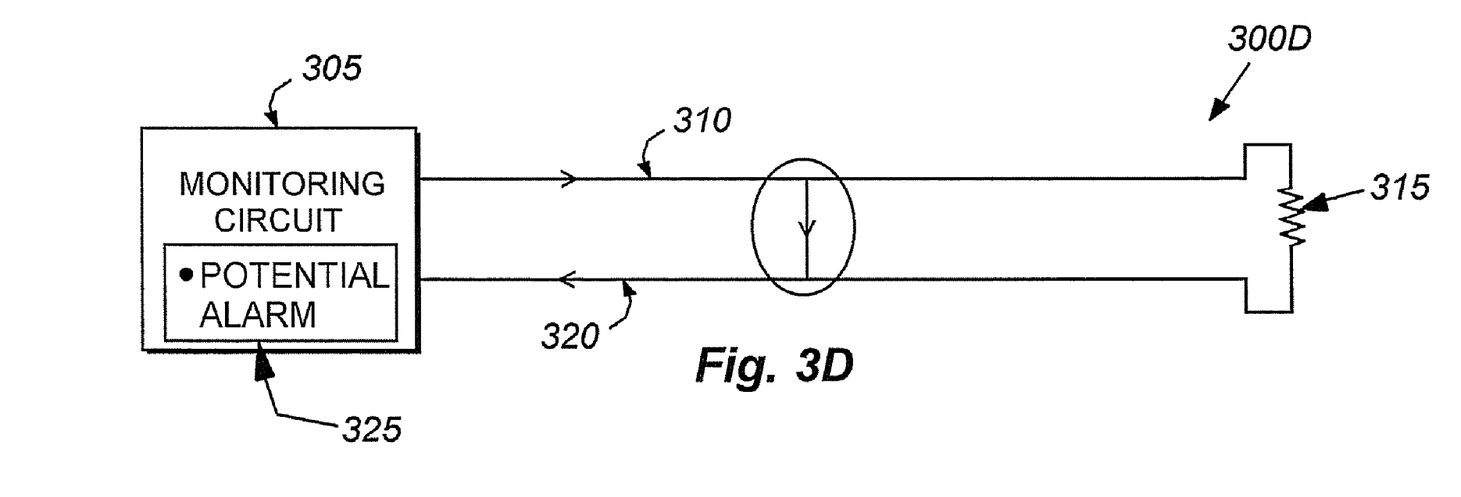
FIG. 3D is a schematic block diagram of an exemplary digital linear heat detector with thermocouple heat confirmation environment illustrating a short (e.g., fire or mechanical malfunction) detection in accordance with an illustrative embodiment of the present invention.

FIG. 3D is a schematic diagram of an exemplary digital linear heat detector with thermocouple heat confirmation environment 300D illustrating the detection of a short in accordance with an illustrative embodiment of the present invention. The monitor then switches to a thermocouple mode in which the monitor is able to identify the temperature at the fault by measuring the difference in voltage between the conductors. As a result of the conductors being made of dissimilar metals/materials, each conductor will generate a different opposing voltage. The difference between these voltages are a function of temperature, and therefore the monitor is able to calculate the temperature at the short.

Illustratively, the digital linear heat detector with thermocouple heat confirmation 300D will not cause an ALARM condition should physical damage cause a short. Should a short occur due to physical damage, e.g., crimping, etc., the loop resistance will drop. The monitoring circuit 305 is illustratively configured to detect this drop in resistance and to report a short has been detected, which may be implemented on the monitor illustratively as POTENTIAL ALARM.

Figure 3E:
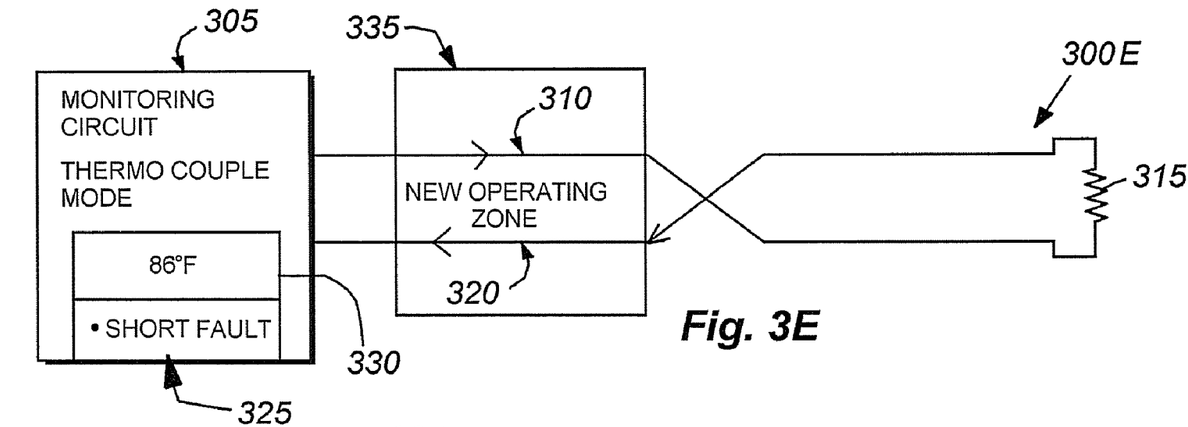
FIG. 3E is a schematic block diagram of an exemplary digital linear heat detector environment with thermocouple heat identification illustrating a short fault condition in accordance with an illustrative embodiment of the present invention.

FIG. 3E is a schematic diagram of an exemplary digital linear heat detector with thermocouple heat confirmation environment 300E illustrating the detection of a short that was not caused by a overheat event (e.g., a fire) in accordance with an illustrative embodiment of the present invention. In the illustrative embodiment of the present invention, if a temperature identified at the short is below a predetermined threshold, the monitor initiates a SHORT FAULT condition, as displayed on monitor 305 in display 325. In the exemplary embodiment, monitor 305 includes a short temperature display 330 which indicates the calculated temperature at the short. However, it should be noted that in alternative embodiments, the monitor may or may not display the calculated temperature as shown in FIG. 3E. As such, the description of a display indicating the calculated temperature at the short should be taken as exemplary only. The monitor 305, in addition, may display the type of condition that is occurring at the short in display 325 (e.g., SHORT FAULT when the temperature is below the predetermined threshold).

Figure 3F:
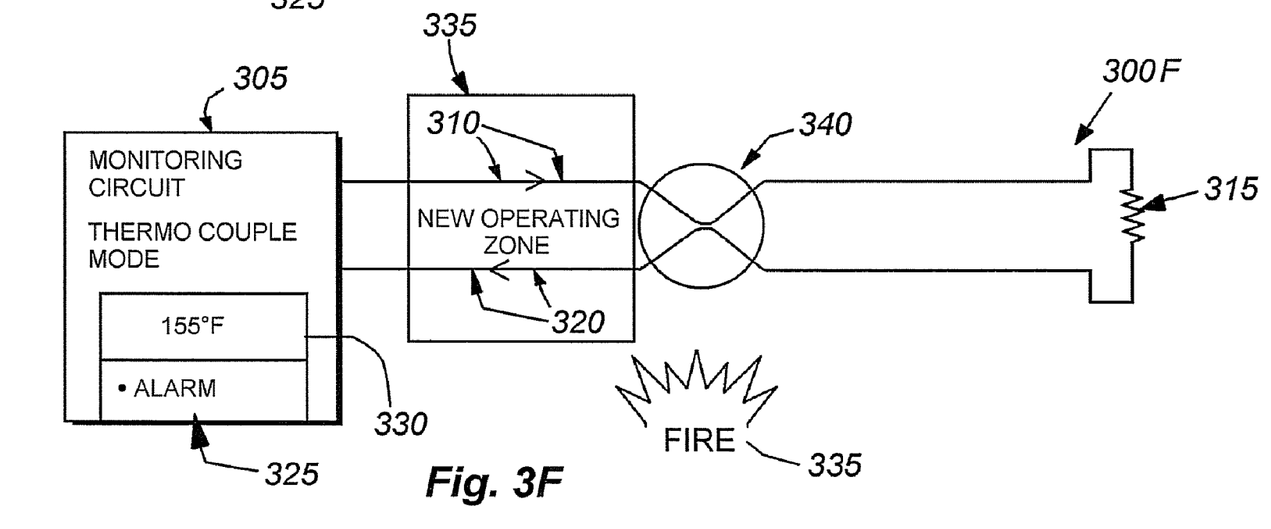
FIG. 3F is a schematic block diagram of an exemplary digital linear heat detector with thermocouple heat confirmation environment illustrating an overheat condition (e.g., a fire) in accordance with an illustrative embodiment of the present invention.

FIG. 3F is a schematic diagram of an exemplary digital linear heat detector with thermocouple heat confirmation environment 300D illustrating the detection of a short that is caused by an overheat condition (e.g., a fires) in accordance with an illustrative embodiment of the present invention. In FIG. 3F, a fire 335 (or other overheat condition) raises the temperature within a region 330 of the linear heat detector 310 and 320. As a result of the heat, the non-conductive heat sensitive polymer melts, thereby causing the dissimilar conductors to be forced together by the spring pressure at region 340. The resistance will decrease due to the conductors shorting together. This change in resistance will be detected by the monitoring circuit 305 and result in short. Again once a short has been detected the monitor enters thermocouple mode and measures voltage of the two conductors. As stated above, by measuring the difference in the voltages in the two conductors (i.e., the Seebeck Effect) the monitor can calculate the temperature at the short. If the temperature is above the predetermined threshold, (as is indicated by display 330), the monitor initiates an ALARM condition in the system. The monitoring circuit 305 may then initiate fire suppression systems, etc., in response to the ALARM condition.

Furthermore, if the heat source is removed prior to the non-conductive heat sensitive polymer melting, the loop resistance will remain normal. This will effectively cancel the ALARM process and the digital linear heat detector with thermocouple heat confirmation will continue to operate. Illustratively, the coated conductors are still held together by the spring pressure, the monitoring circuit 305 will detect this as a NORMAL state and continue to operate normally.

If the heat source, e.g., fire 335, continues to a sufficient length of time, the non-conductive coating will melt, thereby causing a short circuit. The detection of the location of this short circuit may be made using the same techniques as described above with respect to digital linear heat detectors. As will be appreciated by one skilled in the art, other heat events other than fires may cause overheat conditions. As such, although this description is written in terms of a fire, one skilled in the art will recognize that other events may cause overheat conditions. As such, the description of a fire should be taken as exemplary only.

A further advantage of the present invention is that within a zone (i.e., between an initial short and the monitoring circuit) 335 of both FIG. 3E and 3F, the monitor may continue to detect any additional heated sections within zone 335 and perform the same calculations thereon. The monitor 305 is able to detect any additional heated sections in the zone by detecting any increase in voltage due to temperature from either the initial shorted point or a new shorted point in zone 335.

B. Digital Linear Heat Detector Operation

Figure 4:
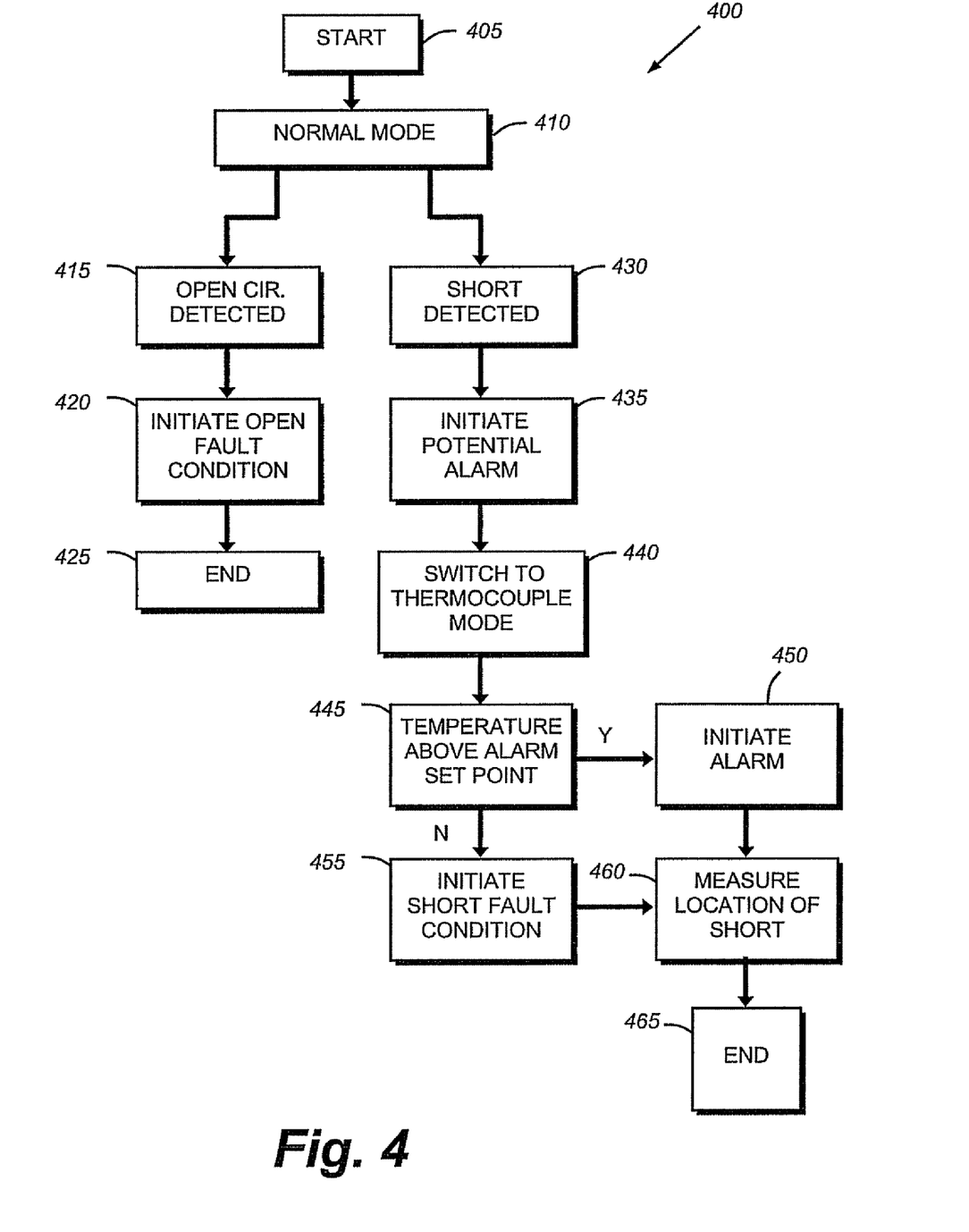
FIG. 4 is a flowchart detailing the steps of a procedure for identifying the type of alarm condition being detected in accordance with an illustrative embodiment of the present invention.

FIG. 4 is a flow chart detailing the steps of a procedure 400 for identifying the type of condition that is occurring in accordance with an illustrative embodiment of the present invention. As will be appreciated by one skilled in the art, the various steps of procedure 400 may occur on varying timescales based on the size and/or temperature of an overheat condition. That is, larger and/or hotter fires (or other overheat conditions) typically will cause procedure 400 to occur more rapidly, while lesser overheat conditions may cause procedure 400 to occur at a less rapid pace. Additionally, depending on the severity of the overheat condition, not all steps of procedure 400 may occur. As such, the description herein of procedure 400 should be taken as exemplary only.

Procedure 400 begins in step 405 and continues to step 410 where the monitor is in a NORMAL state. In the illustrative embodiment, the monitor will remain in NORMAL state until one of two conditions occur. One of those conditions is the detection of an open circuit in step 415. If an open circuit is detected by the monitor, the loop resistance becomes infinite. The monitoring circuit 305 is configured to report an infinite resistance as an OPEN fault condition (step 420). This may cause the monitoring circuit 305 to, e.g., sound an alert or otherwise inform an administrator that there is an open circuit and that the overheat (e.g., fire) detection functionality has been compromised and the procedure completes in step 425.

Another event that would cause the monitor to diverge from its NORMAL STATE occurs when a short is detected in the system in step 430. Illustratively, a short occurs when the current in the circuit begins to flow in a different path than the path originally intended for the current. This may occur in the current invention when the two dissimilar conductors come into contact with each other (e.g., during an overheat event or when the line has been physically damaged).

Once a short has been detected, the monitor initiates a POTENTIAL ALARM in step 435 and switches the monitor to a thermocouple mode in step 440. Once the monitor is in thermocouple mode, calculations are done to determine whether or not the temperature at the short is above the set point/predetermined temperature in step 445, (i.e., the difference between the voltages at each conductor is measured, thereby applying the Seebeck effect). If the calculation determines that the temperature at the short is above the predetermined threshold, then an ALARM condition is initiated in step 450 and the monitor measures the distance to the location of the short in step 460. Illustratively, the monitor is able to measure the distance to the location of the short measuring the new resistance compared to a known resistance per unit length associated with the pair of dissimilar conductors.

If, however, the temperature at the short is below the predetermined threshold, then a SHORT FAULT condition is initiated by the monitor in step 455 and the distance to the SHORT FAULT is also determined in step 460. The initiation of a SHORT FAULT may result in an alert to the administrator that the linear heat detector has been compromised. The procedure then completes in step 465.

It should also be noted, that the monitor may continue to identify and calculate the temperature within the newly created circuit (i.e., the short circuit). The monitor is able to offer continuous observation of both the short and any other additional shorts that may occur between the initial short and the monitoring circuit. Thus, if the temperature at any location along the short circuit reaches the predetermined temperature, then the SHORT FAULT condition will changes to an ALARM condition rather than a SHORT FAULT condition.

C. Digital Linear Heat Detector Composition

Figure 5:
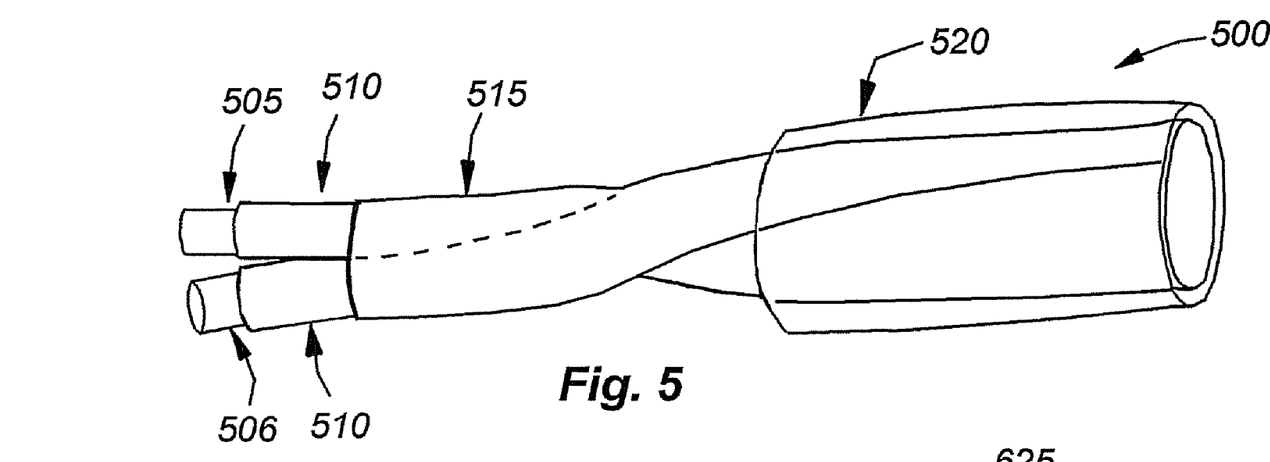
FIG. 5 is a schematic diagram of an exemplary cross-section of a digital linear heat detector with thermocouple heat identification in accordance with an illustrative embodiment of the present invention.
Figure 6:
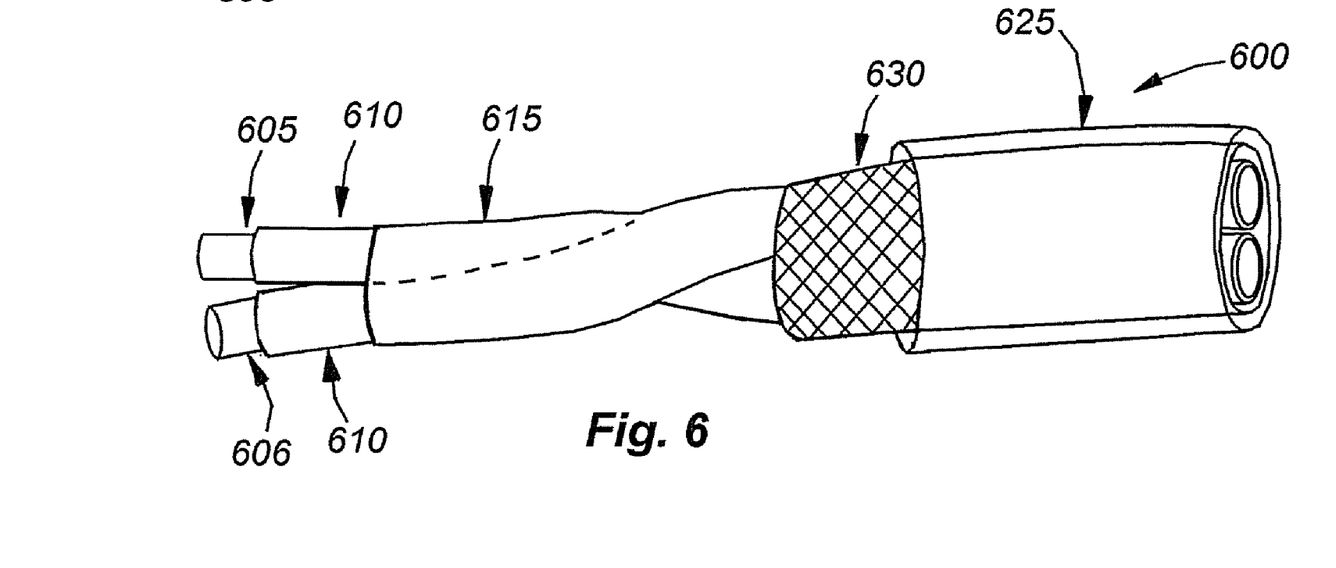
FIG. 6 is a schematic diagram of an exemplary cross-section of a digital linear heat detector with thermocouple heat confirmation including a braided shield in accordance with an illustrative embodiment of the present invention.

Various configurations of digital linear heat detectors with thermocouple heat identification may be utilized in accordance with various embodiments of the present invention. FIGS. 5 and 6 describe various illustrative embodiments of the present invention.

FIG. 5 is a schematic diagram of an exemplary cross-section of digital linear heat detector with thermocouple heat confirmation 500 in accordance with an illustrative embodiment of the present invention. The illustrative digital linear heat detector with thermocouple heat confirmation 500 comprises two spring conductors 505 and 506 wherein 505 is made from a different conductive metal/material than 506 (e.g., galvanized steel and nickel alloys, copper and a nickel alloy, etc.). Exemplary conductors include, e.g., copper coated steel, constantan, nickel copper alloy, alumel, cormel, nicrosil, nisil, platinum, tungsten, rhenium and iron. It is expressly noted that the list of conductors is exemplary only that other conductors may be utilized in accordance with alternative embodiments of the present invention. Both spring conductors are then coated with a non-conductive heat sensitive thermoplastic material 510 and wrapped in a protective tape 515, e.g., Mylar® tape. However, it should be noted that in alternative embodiments, additional and/or differing materials may be utilized, e.g., polypropylene. Exemplary heat sensitive thermoplastic materials that may be utilized include, e.g., ethyl vinyl acetate, polypropylene, polyurethane, polyethylene, and polyvinyl chloride. It should be noted that this list is not exhaustive and that other heat sensitive thermoplastic materials may be utilized in accordance with alternative embodiments of the present invention. Further, the description of a Mylar® tape should be taken as exemplary only. The combined twisted spring conductors are wrapped in a protective outer jacket 520. This outer jacket 520 may be made of a polyvinyl or other non-conductive durable material. However, again it should be noted that in alternative embodiments, additional and/or differing materials may be utilized, e.g. a flame retardant jacket of polypropylene elastomer.

FIG. 6 is a schematic diagram of an alternative exemplary cross-section of a digital linear heat detector with thermocouple heat confirmation 600 in accordance with an illustrative embodiment of the present invention. The digital linear heat detector with thermocouple heat confirmation 600 includes two spring conductors made of dissimilar metals, 605 and 606. Again, the two dissimilar conductors 605 and 606 are each coated with non-conductive heat sensitive thermoplastic material 610, twisted together and wrapped with protective tape 615 to form spring conductors. Then a flexible braided metallic shield/covering 630 is added over the protective tape and covered with a non-conductive durable material 625. The braided metallic shield may be made of, for example, galvanized steel. However, it should be noted that in alternative embodiments, additional and/or differing materials may be utilized, e.g., corrosion resistant alloys, metals, foils and/or tapes.

Figure 7:
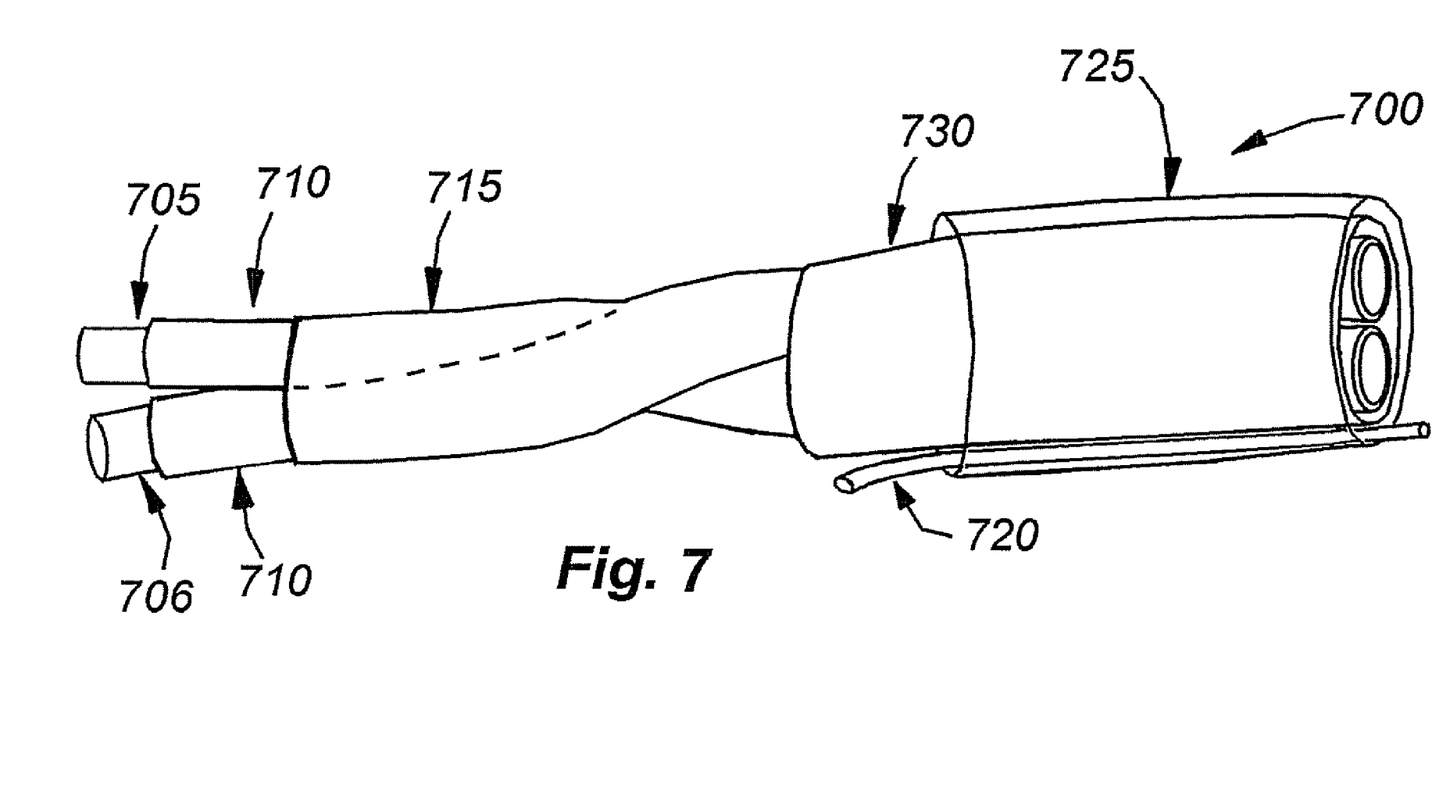
FIG. 7 is a schematic diagram of an exemplary cross-section of a digital linear heat detector with thermocouple heat confirmation including a conductive tape shield and drain wire in accordance with an illustrative embodiment of the present invention

FIG. 7 is a schematic diagram of an alternative exemplary cross-section of a digital linear heat detector with thermocouple heat confirmation 700 including a drain wire 720 in accordance with an illustrative embodiment of the present invention. The digital linear heat detector with thermocouple heat confirmation 700 includes two spring conductors made of dissimilar metals, 705 and 706. Again, the two dissimilar conductors 705 and 706 are each coated with non-conductive heat sensitive thermoplastic material 710, twisted together and wrapped with protective tape 715 to form spring conductors. Then a conductive tape 730 is added over the protective tape and covered with a non-conductive durable material 725. A drain wire 720 is enclosed by the non-conductive material 725.

As will be appreciated by one skilled in the art, the various compositions of digital linear heat detector with thermocouple heat confirmation described above with reference to FIGS. 5-7 are exemplary only. Additional variations of layers of non-conductive heat sensitive thermoplastic material, high-melt temperature braids, etc. may be made without departing from the spirit or scope of the present invention. Furthermore, it is expressly contemplated that the various compositions of the spring conductors and/or the non-conductive heat sensitive thermoplastic material may vary from that described herein. As such, the descriptions of specific materials and/or properties should be taken as exemplary only.

What is claimed is:

1. A digital linear heat detector with thermocouple heat confirmation comprising:
   a first conductor comprising a first material and a second conductor comprising a second material, the first and second conductors each coated with a layer of a non-conductive heat resistance material and twisted together to create a substantially continuous spring pressure between the first conductor and the second conductor to cause the layers of the non-conductive heat sensitive thermoplastic material to be in contact; and
   a monitoring circuit configured to monitor resistance along the first and second conductors and further configured to, in response to the resistance changing along the first and second conductors, detect a short and enter a thermocouple mode.

2. The digital linear heat detector of claim 1 wherein the thermocouple mode is configured to measure the temperature at the short and determine an alarm condition.

3. The digital linear heat detector of claim 1 wherein the first material comprises copper coated steel.

4. The digital linear heat detector of claim 1 wherein the second material comprises a nickel and copper alloy.

5. The digital linear heat detector of claim 1 wherein the monitoring circuit is configured to, in response to the short being identified by the thermocouple mode as being above a predetermined temperature, initiate an alarm condition.

6. The digital linear heat detector of claim 1 wherein the monitoring circuit is configured to, in response to the short being identified by the thermocouple mode as being below a predetermined temperature, initiate a short fault condition.

7. The digital linear heat detector of claim 6 wherein the monitor is further configured to continue to measure the temperature along a short circuit even after the short alarm condition has been determined.

8. The digital linear heat detector of claim 1 wherein the non-conductive temperature sensitive material comprises ethyl vinyl acetate.

9. The digital linear heat detector of claim 1 wherein the monitoring circuit is configured to, in response to the resistance reaching a predefined level, initiate a potential alarm state.

10. The digital linear heat detector of claim 9 wherein the first material comprises copper coated steel.

11. The digital linear heat detector of claim 9 wherein the second material comprises a copper and nickel alloy.

12. The digital linear heat detector of claim 9 wherein the monitor is further configured to, in response to the temperature being above a predetermined threshold, initiate an alarm condition.

13. The digital linear heat detector of claim 12 wherein the monitor is further configured to, in response to the temperature being below a predetermined threshold, initiate a short fault condition.

14. The system of claim 9 wherein the non-conductive heat sensitive thermoplastic material comprises ethyl vinyl acetate.

15. The system of claim 9 wherein the monitoring circuit is configured to, in response to the resistance reaching a predefined level, initiate a potential alarm state.

16. A system for identifying the temperature at a short in a digital linear heat detector, the system comprising:
   a first conductor made of a first material, the first material coated with a first layer of a non-conductive heat sensitive thermoplastic material;
   a second conductor made of a second material, the second material coated with a second layer of a non-conductive heat sensitive thermoplastic material;
   a protective tape wrapped around the first and second conductors, the first and second conductors twisted together to create a substantially continuous spring pressure between the first and second conductors;
   a monitoring circuit configured to monitor resistance along the first and second conductors and wherein the monitoring circuit is further configured to, in response to the resistance changing along the first and second conductors,
      (i) detect, in response to a change in resistance, a short;
      (ii) initiate, in response to the detected short, entering a thermocouple mode when a short is detected, the thermocouple mode able to identify the type of condition at the short;
      (iii) identify the temperature at the short by calculating the difference in voltage being supplied over the first conductor and the second conductor; and
      (iv) determine that the temperature is above a predetermined threshold, in response to identifying the temperature at the short.

17. A method for operating digital linear heat detector comprising:
   monitoring resistance along a first and second conductor of the digital linear heat detector, wherein the first and second conductor are made of different conductive materials;
   detecting, in response to a change in resistance, a short;

entering, in response to the detected short, a thermocouple mode able to identify a type of condition at the detected short;

identifying a temperature at the short by calculating a difference in voltage being supplied over the first conductor and the second conductor;

in response to identifying the temperature at the short, determining that the temperature is above a predetermined threshold;

in response to the temperature being below the predetermined threshold, initiating a short fault alarm; and in response to the temperature being above the predetermined threshold, initiating an alarm state.

18. The method of claim 17 further comprising continuing to measure the temperature along the short even after the condition has been identified.

19. The method of claim 17 further comprising identifying a location of the short along the first and second conductors.

20. The method of claim 19 wherein identifying the location comprises measuring a resistance compared to a known resistance per unit length associated with the first and second conductors.

* * * * *